No. 865,610. PATENTED SEPT. 10, 1907.
G. PULLETS.
DEVICE FOR SECURING AN ASBESTOS COVERING AND PLASTER
TO A HOT AIR DUCT OR PIPE.
APPLICATION FILED AUG. 28, 1906.
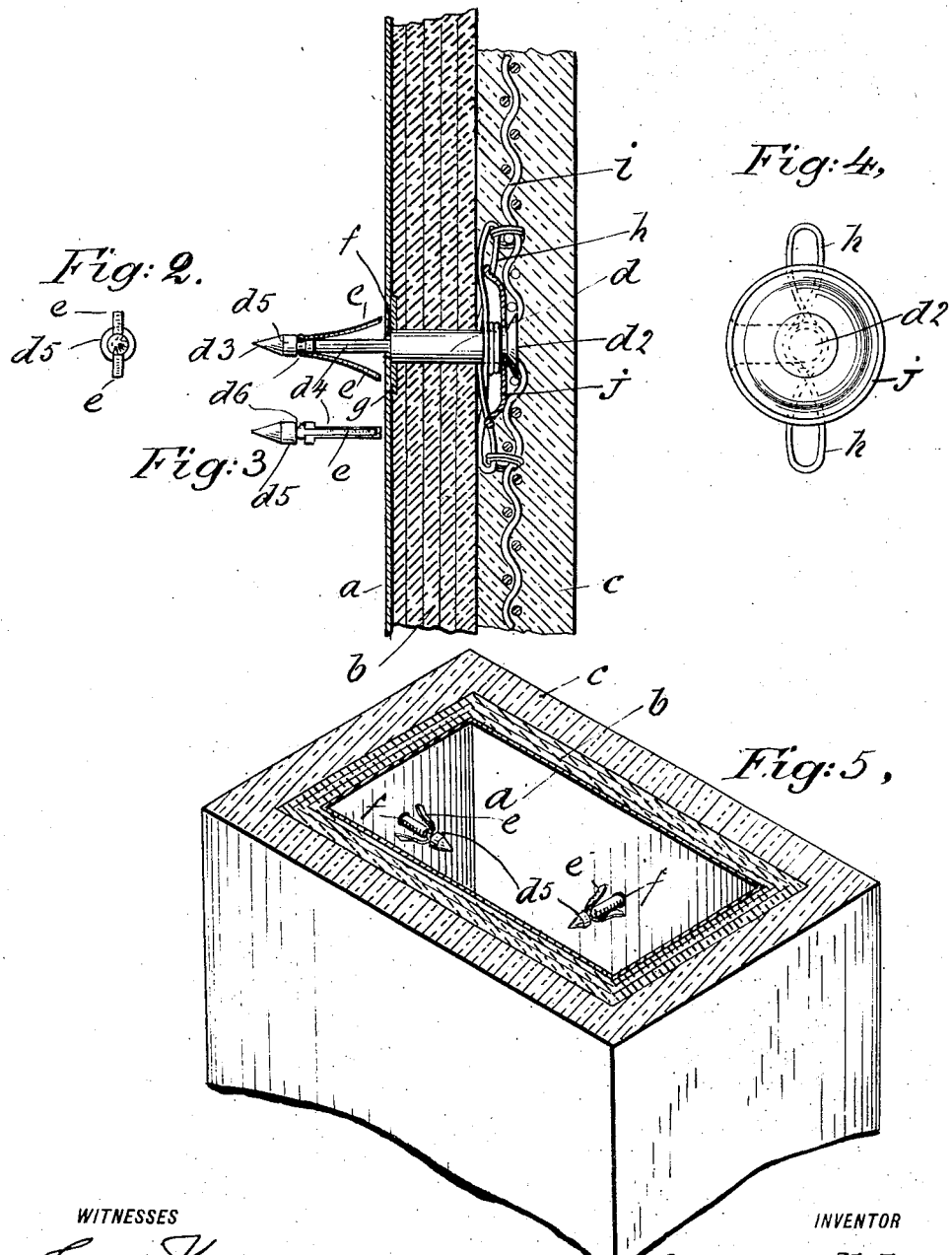
WITNESSES
INVENTOR
George Pullets,
BY Edgar Tate & Co.
ATTORNEYS.

UNITED STATES PATENT OFFICE.

GEORGE PULLETS, OF NEW YORK, N. Y.

DEVICE FOR SECURING AN ASBESTOS COVERING AND PLASTER TO A HOT-AIR DUCT OR PIPE.

No. 865,610.          Specification of Letters Patent.          Patented Sept. 10, 1907.

Application filed August 28, 1906. Serial No. 332,339.

*To all whom it may concern:*

Be it known that I, GEORGE PULLETS, a subject of the King of Greece, residing at New York, in the county of New York and State of New York, have invented certain new and useful Improvements in Devices for Securing an Asbestos Covering and Plaster to a Hot-Air Duct or Pipe, of which the following is a specification, such as will enable those skilled in the art to which it appertains to make and use the same.

This invention relates to hot air ducts or pipes used in hotels, apartment houses and other buildings, and the object thereof is to provide an improved device for securing to such air ducts or pipes a covering of asbestos and plaster with which the said air ducts or pipes are usually provided.

The invention is fully disclosed in the following specification, of which the accompanying drawing forms a part, in which the separate parts of my improvement are designated by suitable reference characters in each of the views, and in which:—

Figure 1 is a sectional view of one side of an air duct or pipe covered with asbestos and plaster and showing my improved device for securing the said covering to the air duct or pipe; Fig. 2 an end view of the smaller end of the device which I employ for the purpose specified; Fig. 3 a side view of the end of the device shown in Fig. 2; Fig. 4 a view of the end of the device opposite that shown in Fig. 2; and, Fig. 5 a sectional and perspective view of an air duct or pipe covered with asbestos and plaster, the asbestos and plaster being held in place by means of my improved fastening device or devices.

In the drawing forming part of this specification I have shown at $a$ an ordinary hot air duct or pipe provided with a covering $b$ of asbestos over which is placed a covering $c$ of plaster, and in the practice of my invention I provide a fastening device for securing the asbestos and plaster to the air duct or pipe which comprises a nail $d$ having a driving head $d^2$ and a pointed end $d^3$, that portion of the nail $d$ adjacent to the pointed end $d^3$ is reduced in size as shown at $d^4$, and the pointed end $d^3$ comprises a head $d^5$ which is larger than the reduced portion $d^4$ of the nail but smaller than the body of the nail adjacent to the driving head $d^2$, and the pointed head $d^5$ is provided, in the form of construction shown, with an annular groove $d^6$ in which is secured a spring pawl or pawls $e$.

In practice I prefer to bore a hole or holes $f$ in the air duct or pipe, said hole or holes being smaller than the large body portion of the nail, and in practice, the pointed end of the nail is driven through the asbestos and through the holes $f$, and in this operation the spring pawl or pawls $e$ are compressed close to the reduced part $d^4$ of the nail, and after the nail has been driven entirely through the asbestos and the wall of the air duct or pipe the spring pawl or pawls $e$ spring outwardly and prevent the withdrawal of the nail. I may also provide a washer $g$ which is placed on the outer side of the wall of the air duct or pipe and through which the nail is passed, said washer being intended to more securely close the hole through which the pointed head $d^5$ of the nail is driven. The outer end of the nail is also provided with a wire loop fastening device $h$ which is wound thereon and provided with projecting loop members to which, in practice, is secured a layer of wire mesh as shown at $i$, and after the asbestos covering $b$ is secured to the air duct or pipe and the wire mesh $i$ connected with the fastening device or devices, the covering of plaster is placed on the air duct or pipe as shown in Fig. 1 and in the usual manner, and the wire mesh securely holds the plaster as will be readily understood. In the construction shown a washer $j$ is also connected with the head end $d^2$ of the nail to prevent the said head from being driven into or through the asbestos covering and to more securely hold said covering, and said washer also serves to shorten the nail or regulate the length thereof according to the thickness of asbestos covering required, and in addition to the washer $j$, or independently thereof if desired, I may employ a U-shaped washer which is driven in between the head of the nail and the asbestos covering for the purpose of shortening, in effect, the body or projecting shank of the nail when the asbestos covering is too thin to fill out the length of the body portion or shank of the nail, said U-shaped washer being indicated in dotted lines in Fig. 4.

Both the wire loop fastening device and the washer $j$ may be removed or connected with the nail or nails whenever desired, and in practice the pointed head end $d^5$ of the nail may be driven through the asbestos covering and the wall of the air duct or pipe if desired, in which event the boring of the hole $f$ would not be necessary.

It will be understood that any desired number of the fastening devices may be employed, and in this way the covering of asbestos may be secured to the air duct or pipe quicker and much more conveniently than is possible with the usual method.

The spring pawl or pawls $e$ may be secured to the pointed head $d^5$ in any desired manner, and any form of device of this kind which will enable the pointed head $d^5$ to be driven through the wall of the air duct or pipe and lock the nail in said air duct or pipe when so driven may be employed.

The boring of a hole or holes $f$ in the wall of the air duct or pipe is not absolutely necessary as said air duct or pipe is usually composed of sheet metal through which the pointed head or pointed end $d^5$ may be driven.

Having fully described my invention, what I claim as new and desire to secure by Letters Patent, is:—

1. The herein described means for securing asbestos covering and plaster to a hot air duct or flue, comprising a nail provided at one end with a driving head and at the opposite end with a pointed head, the shank of the nail being provided adjacent to the pointed head with means for preventing its withdrawal when driven into the duct or flue, and said nail being also provided adjacent to the driving head with means for securing a mesh work of wire thereto.

2. The herein described means for securing asbestos covering and plaster to a hot air duct or flue, comprising a nail provided at one end with a driving head and at the opposite end with a pointed head, the shank of the nail being provided adjacent to the pointed head with means for preventing its withdrawal when driven into the duct or flue, and said nail being also provided adjacent to the driving head with means for securing a mesh work of wire thereto, and with a washer.

3. The herein described means for securing asbestos covering and plaster to a hot air duct or flue, comprising a nail provided at one end with a driving head and at the opposite end with a pointed head, the shank of the nail adjacent to the pointed head being reduced in size and being provided adjacent to said head with means for preventing the withdrawal of the nail when driven into the duct or flue, said nail being also provided adjacent to the driven head with means for securing a mesh work of wire thereto, substantially as shown and described.

4. The herein described means for securing asbestos covering and plaster to a hot air duct or flue, comprising a nail provided at one end with a driving head and at the opposite end with a pointed head, the shank of the nail adjacent to the pointed head being reduced in size and being provided adjacent to said head with means for preventing the withdrawal of the nail when driven into the duct or flue, said nail being also provided adjacent to the driven head with means for securing a mesh work of wire thereto, and with means for limiting the extent to which the nail may be driven into the flue, substantially as shown and described.

5. The herein described means for securing asbestos covering and plaster to a hot air duct or flue, comprising a nail provided at one end with a driving head and at the opposite end with a pointed head, the shank of the nail adjacent to the pointed head being reduced in size and being provided adjacent to said head with means for preventing the withdrawal of the nail when driven into the duct or flue, said nail being also provided adjacent to the driving head with means for securing a mesh work of wire thereto, and with means for limiting the extent to which the nail may be driven into the flue consisting of a washer or washers mounted thereon, substantially as shown and described.

In testimony that I claim the foregoing as my invention I have signed my name in presence of the subscribing witnesses this 25th day of August 1906.

GEORGE PULLETS.

Witnesses:
F. A. STEWART,
C. E. MULREANY.